US012779899B2

(12) United States Patent
De Souza et al.

(10) Patent No.: US 12,779,899 B2
(45) Date of Patent: Nov. 3, 2026

(54) ATTACHMENT ARRANGEMENT FOR COMPOSITE WHEELS

(71) Applicant: Carbon Revolution Limited, Waurn Ponds (AU)

(72) Inventors: Timothy De Souza, Armstrong Creek (AU); Tomas Jack Bastian, Torquay (AU); Toby Kyle Lawson, Mount Evelyn (AU); Ashley James Denmead, Belmont (AU)

(73) Assignee: Carbon Revolution Pty Ltd, Waurn Ponds (AU)

( * ) Notice: Subject to any disclaimer, the term of this patent is extended or adjusted under 35 U.S.C. 154(b) by 284 days.

(21) Appl. No.: 18/561,061

(22) PCT Filed: May 16, 2022

(86) PCT No.: PCT/AU2022/050468

§ 371 (c)(1),
(2) Date: Nov. 15, 2023

(87) PCT Pub. No.: WO2022/241510

PCT Pub. Date: Nov. 24, 2022

(65) Prior Publication Data

US 2024/0253391 A1 Aug. 1, 2024

(30) Foreign Application Priority Data

May 17, 2021 (AU) ................................ 2021901463
Feb. 28, 2022 (AU) ................................ 2022900475

(51) Int. Cl.
*B60B 3/14* (2006.01)
*B60B 3/16* (2006.01)

(52) U.S. Cl.
CPC ................ *B60B 3/147* (2013.01); *B60B 3/16* (2013.01); *B60B 2360/36* (2013.01)

(58) Field of Classification Search
CPC ........... B60B 3/145; B60B 3/147; B60B 3/16; B60B 5/02
See application file for complete search history.

(56) References Cited

U.S. PATENT DOCUMENTS 5,056,870 A 10/1991 Plumer
5,542,753 A * 8/1996 Plumer ..................... B60B 3/16 411/917

(Continued)

FOREIGN PATENT DOCUMENTS

DE 102013221514 A1 4/2015
EP 0111177 B1 1/1987

(Continued)

OTHER PUBLICATIONS

International Search Report and Written Opinion for International Application No. PCT/AU2022/050468, dated Jul. 7, 2022, 15 pages.

(Continued)

*Primary Examiner* — Kip T Kotter
(74) *Attorney, Agent, or Firm* — Buchanan Ingersoll & Rooney PC

(57) ABSTRACT

An attachment arrangement for attaching a composite wheel to a wheel mount, including an attachment aperture that receives an elongate fastener element. A fastening body, including or fastened to the elongate fastener element, has an engagement portion and an attachment insert including a bearing body, a fastening aperture, and an insert section extending axially away from the bearing body and into the attachment aperture. An engagement surface, located at least in part between the bearing body and a distal end of the insert section, extends from an inner surface of the insert section and is configured complementary to and engages the fastening body engagement portion. The insert section distal end extends into the attachment aperture and is spaced from the wheel mount, or from or in an element in, on, integral (Continued)

with, or adjacent to the wheel mount, without directly engaging the wheel mount and/or element.

20 Claims, 8 Drawing Sheets

(56) References Cited

U.S. PATENT DOCUMENTS

| | | | | |
|---|---|---|---|---|
| 5,711,581 | A | 1/1998 | Plumer | |
| 6,296,319 | B1 | 10/2001 | Hummel et al. | |
| 6,416,135 | B1 * | 7/2002 | Greubel | B60B 5/02 301/35.625 |
| 8,911,026 | B2 * | 12/2014 | Pruden | B60B 3/16 301/35.632 |
| 2014/0049096 | A1 * | 2/2014 | Hess | B60B 5/02 301/95.101 |
| 2014/0175863 | A1 | 6/2014 | Dingle et al. | |
| 2014/0346845 | A1 | 11/2014 | Renner | |
| 2016/0016427 | A1 | 1/2016 | Keller et al. | |
| 2016/0207351 | A1 | 7/2016 | Denmead et al. | |
| 2016/0325582 | A1 | 11/2016 | Werner et al. | |
| 2017/0087930 | A1 | 3/2017 | McMaster et al. | |
| 2021/0354505 | A1 | 11/2021 | Mayer et al. | |

FOREIGN PATENT DOCUMENTS

| | | | | |
|---|---|---|---|---|
| EP | 0553696 | A2 * | 8/1993 | B60B 3/16 |
| JP | 5591401 | A | 7/1980 | |
| JP | 1111101 | A | 1/1999 | |
| JP | 2021020603 | A | 2/2021 | |
| WO | 2010025495 | A1 | 3/2010 | |
| WO | 2013000009 | A1 | 1/2013 | |
| WO | 2019033151 | A1 | 2/2019 | |
| WO | 2019033169 | A1 | 2/2019 | |
| WO | 2020083973 | A2 | 4/2020 | |
| WO | 2021020053 | A1 | 2/2021 | |

OTHER PUBLICATIONS

The Extended European Search Report issued Mar. 18, 2025, by the European Patent Office in corresponding European Patent Application No. 22803471.6-1009. (9 pages).

* cited by examiner

ATTACHMENT ARRANGEMENT FOR COMPOSITE WHEELS

PRIORITY CROSS-REFERENCE

The present application is a U.S. National Phase of International Application No. PCT/AU2022/050468, filed 16 May 2022, and claims priority from Australian Provisional Patent Application No. 2021901463 filed on 17 May 2021 and Australian Provisional Patent Application No. 2022900475 filed on 28 Feb. 2022, the contents of are incorporated herein by reference.

TECHNICAL FIELD

The present invention generally relates to an arrangement for attaching one or more composite wheels to a mount, in particular the wheel mount of a vehicle. The invention is particularly applicable to attachment arrangements for carbon fibre wheels used to attach a carbon fibre wheel to a wheel mount of a vehicle and it will be convenient to hereinafter disclose the invention in relation to that exemplary application.

BACKGROUND TO THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Attaching composite structures to other components or structures can be challenging. Composite structures, such as carbon fibre components, are generally extremely stiff in the fibre direction, but can have less strength perpendicular to the fibre direction. Attachment holes for a bolted joint connection are generally formed perpendicular to the fibre direction. Compressive loads through a joint formed through such attachment holes will therefore be perpendicular to the fibres rather than aligned with them. The stiffness of the material perpendicular to the fibres is quite low. Consequently, a low clamping pressure is required between the head of a bolt/washer and a mount to which it is to be connected to avoid damage. High clamping pressures can damage the composite material at or immediately adjacent a preformed attachment hole, causing delamination at or immediately adjacent the edge of that attachment hole. This makes it difficult to achieve a stiff joint with conventional attachment and fastening arrangements.

A washer may be used to distribute the load over a greater area. However, conventional flat washers provide an uneven load distribution about the attachment aperture. In most cases, the load is greater in the region closer to the head of the bolt, thus creating an undesirable high compression zone close to the edge of the attachment hole.

Special fastener combinations may therefore be used for composite structures. However, most prior bolt-nut combinations include geometries which effect a loading of composite structures at or immediately adjacent an attachment hole in which they are used, and therefore contribute to a weakening, breakdown or destruction of the composite material in this area.

One attachment arrangement system that addresses this problem is taught in the Applicant's international patent publication No. WO2013/000009A1. This arrangement fits through an attachment aperture of a composite wheel and is designed to attach the composite wheel to elongate fastener elements (wheel studs) of a vehicle's wheel mount. The attachment arrangement comprises a fastening washer having a fastening aperture through which an elongate fastener element from a wheel mount can be inserted when in use and a base configured to face a surface of the composite wheel about the attachment aperture. In addition, the fastening washer has an angled fastening surface which includes at least one engagement surface configured to operatively engage a complementary portion of the fastening nut when the fastening nut is assembled on the elongate fastener element. The fastening arrangement also includes a sleeve which extends axially relative to the fastening axis outwardly from the base about the fastening aperture and into the attachment aperture of the composite wheel.

WO2013/000009A1 teaches that the head of the fastening washer is configured to provide an increased clamping contact area with the surface of the composite wheel surrounding the attachment aperture and thereby increase the area through which the clamping force is applied to that area. The complementary angled surfaces of the fastening washer and the fastening nut are exemplified as being located in the head of the fastening washer above or in line with the composite surface of the wheel in order to exert a direct (pushing) compression force from the engagement surface to the base of the fastening washer to clamp that part of the composite wheel between the head of the fastening washer and a backing plate.

However, the Applicant has found that this existing attachment arrangement may require modifications to a vehicle's wheel mounting structure in order of properly fasten a composite wheel to the vehicle. In many instances the length of the wheel studs used in the wheel mount need to be lengthened in order to fully extend through the sleeve and fastening aperture to engage with the fastening nut. In many circumstances, it is preferable to have an attachment arrangement that is compatible with the conventional wheel stud length of that vehicle.

It would therefore be desirable to provide an improved or alternate attachment arrangement for a composite wheel that overcomes one or more of the above limitations.

SUMMARY OF THE INVENTION

A first aspect of the present invention provides an attachment arrangement configured to attach at least one composite wheel to a wheel mount, the composite wheel including at least one attachment aperture through which an elongate fastener element is inserted, the attachment arrangement including:

(A) a fastening body which includes the elongate fastener element or is configured to be fastened onto the elongate fastener element, the fastening body having an engagement portion; and (B) an attachment insert that includes:

- a bearing body which includes a base configured to face a surface of the composite wheel about the attachment aperture;
- a fastening aperture through which the elongate fastener element is inserted when in use, the fastening aperture including a fastening axis;
- an insert section which extends axially away from the base of the bearing body relative to the fastening axis about the fastening aperture, the insert section being configured to extend into the attachment aperture of the composite wheel; and at least one engagement surface extending from an inner surface of the insert section, the at least one engagement surface having a substantially complementary configuration to the engagement portion of the fastening body and is configured to operatively engage the engagement portion of the fastening body when the fastening body fastens to the wheel mount through the elongate fastener element, wherein at least a portion of the at least one engagement surface is located between the base of the bearing body and a distal end of the insert section, and wherein the distal end of the insert section extends into the attachment aperture of the composite wheel and is spaced apart from the wheel mount, or from or in an element located in, on, integral with, or adjacent to the wheel mount such the distal end of the insert section does not directly engage with the wheel mount and/or said element.

The attachment arrangement of the present invention provides the same advantages as the Applicant's previous attachment arrangement configuration taught in WO2013/000009A1 enabling the composite wheel to have an extremely stiff fastening to the wheel mount relative to the fastening body without damaging the composite wheel. The extremely stiff fastening to the wheel mount relative to the fastening body assists in reducing or substantially eliminate loss of fastening torque associated with any external loading conditions in the attachment arrangement. Progressive loss of fastening torque can result in the bolted joint loosening and can cause the fastener to rotate resulting in further torque loss and reduction of the joint clamping load.

However, the new and advantageous design of the attachment arrangement of the present invention recesses the fastening body through the bearing body, enabling the engagement portion of the fastening body and the engagement surface of the arrangement to have at least a portion positioned below the base of the bearing body and below the top surface level of the composite wheel. In this regard, the engagement surface is located at least partially within the insert section of the attachment insert (as discussed below).

This recessed positioning (partial or full recess as discussed below) of the engagement surface of the arrangement enables the attachment arrangement to accommodate shorter elongate fasteners (wheel studs) compared to the arrangement taught in WO2013/000009A1. This provides a smaller stack height (i.e. the height from the mid-point of the engagement portion of the fastening body to the back surface of the mount (typically the wheel mount) than is possible in the arrangement taught in WO2013/000009A1 where the engagement surface is located fully above the surface of the composite wheel in the fastening washer. This provides the advantage of retaining standard vehicle wheel stud lengths and wheel body designs. No special considerations are therefore required to mount a composite wheel onto standard length wheel studs.

It should be appreciated that this positioning creates an indirect clamping force from the fastening body to the base of the fastening washer. In use, the fastening body is fastened onto the end of the elongate fastener element (for example a wheel stud), engaging the engagement portion of the fastening body onto the at least one engagement surface creating a compression force on the at least one engagement surface. This in turn creates a tension force between the at least one engagement surface and the fastening washer, which in turn applies a compression force from the base of the fastening washer onto the surface of the composite wheel around the attachment aperture. The wheel components can then be sandwiched together onto the wheel mount.

In the present invention, the at least one engagement surface includes a distal end and said distal end of the engagement surface is preferably located axially away from the base of the bearing body—relative to the fastening axis—and between the base of the bearing body and the distal end of the insert section. However, the location of the engagement surface within the attachment insert can vary depending on the desired configuration and function of the attachment arrangement.

In all embodiments, the engagement surface is located at least partially within the insert section of the attachment insert. However, in some embodiments, at least part of the least one engagement surface is located axially above the base of the bearing body relative to the fastening axis. In such embodiments, at least a part of the engagement surface may be located within the bearing body, and thus above the surface of the composite wheel surrounding that the attachment aperture. In most cases, that above surface portion of the engagement surface would only be an initial (top) section of the engagement surface, with a substantive portion of the engagement surface located in the insert section, and thus located axially below the base of the bearing body relative to the fastening axis. The distal end of the at least one engagement surface will therefore be located axially away from the base of the bearing body—relative to the fastening axis—and between the base of the bearing body and the distal end of the insert section.

It should be appreciated that the engagement surface may comprises an elongate feature for example a ramp or curve. In many embodiments, the midpoint of the engagement surface can be determinate in whether the engagement surface is above or below the surface of the composite wheel surrounding the attachment aperture. Where the midpoint of the engagement surface falls above the surface of the composite wheel surrounding that the attachment aperture, the engagement surface is substantially above the surface of the composite wheel surrounding that the attachment aperture. Where the midpoint of the engagement surface falls below the surface of the composite wheel surrounding that the attachment aperture, the engagement surface is substantially below the surface of the composite wheel surrounding that the attachment aperture.

In other embodiments, the engagement surface is located fully below the base of the bearing body. For example, the at least one engagement surface can be located axially away from the base of the bearing body, and axially through and below the fastening aperture, relative to the fastening axis.

In some embodiments, the at least one engagement surface is substantially located between the base of the bearing body and the distal end of the insert section. Here, the engagement surface may be substantially located within the insert section of the attachment insert, and preferably the engagement surface will be located within the insert section. When located in the insert section, the engagement surface will be positioned between the base of the bearing body and the distal end of the insert section.

The bearing body is preferably configured to receive the fastening body therein, to enable the engagement portion of the fastening body to engage with the engagement surface. In order to accommodate the fastening body, the bearing body preferably includes a body aperture sized to receive the fastening body. The body aperture comprises a circular or polygonal shaped recess sized to accommodate the fastening body, and if required a portion of tool used to manipulate the fastening body. The body aperture typically comprises a recess which steps into the fastening aperture.

In embodiments, the body aperture extends into the insert section of the attachment insert. Thus, part of the insert section can be configured to receive a portion of the fastening body. In some embodiments, the body aperture is located axially below the base of the bearing body relative to the fastening axis. This allows at least a position of the fastening body and engagement portion thereof to be housed and/or recessed within the bearing body, and in some cases housed and/or recessed into the insert section.

Where the insert section is configured to receive a portion of the fastening body, the insert section can include a first section having a first internal diameter to receive the fastening body, and a second section having a second internal diameter sized to capture the fastening body, and through which the elongate fastener element can extend. Here, the insert section has a stepped diameter where the first section receives and encloses the fastening body, whilst the second section includes the at least one engagement surface and is sized to receive the elongate fastener element therethrough, and have a diameter that captures the fastening body—i.e. is sized so that that the fastening body cannot fully extend through an aperture formed with the second diameter.

The bearing body section of the attachment arrangement of the present invention is configured to provide an increased clamping contact area with the surface of the composite wheel surrounding the attachment aperture and thereby increase the area through which the clamping force is applied to that area. The bearing body is configured to engage the surface of the composite wheel surrounding the attachment aperture through base section thereof.

The bearing body can have any suitable shape and configuration. In some embodiments, the bearing body has a circular or toroidal shape or the like. In other embodiments, the bearing body can have a planar configuration.

The base of the bearing body is preferably configured to transfer compression force from the bearing body through to the composite wheel. The base can therefore have a complementary configuration to the surface of the composite wheel it faces. More preferably, the base has complementary contours and features to the surface of the composite wheel about the attachment aperture. For example, where the surface of the composite wheel about the attachment aperture is substantially flat, the base can include a substantially flat contact (engagement) surface. This surface can be configured to abut the surface of the composite wheel about the attachment aperture. In other embodiments, the bearing body has a contoured engagement face having a complementary configuration to the surface of the composite wheel on which the bearing body engages.

The bearing body is not necessarily restricted to provide an increased clamping contact area with the surface of the composite wheel surrounding a single attachment aperture. Where the composite wheel includes at least two attachment apertures, and the bearing body can be configured to extend over the surface of the composite wheel between and around at least two of these attachment apertures. In some embodiments, the bearing body can be configured to extend over the surface of the composite wheel between and around all of the attachment apertures. In these embodiments, the bearing body can comprise a substantially planar body, preferably a plate, which extends between and around each attachment aperture. The bearing body is therefore configured as a shared body that provides an increased clamping contact area with the surface of the composite wheel over the surface of the composite wheel around each of the attachment apertures. In this shared bearing body configuration, that bearing body includes at least two fastening apertures and at least two insert sections corresponding to the number of attachment apertures in said composite wheel, each insert section extending into a respective attachment aperture of the composite wheel. The attachment insert for each attachment aperture therefore includes a shared or common bearing body which extends over and bears against the surface of the composite wheel. However, a fastening aperture, an insert section and engagement surface are provided within each attachment aperture. A fastening body and associated elongate fastener are received through each fastening aperture.

The fastening body can comprise any suitable fastener arrangement used to attach a composite wheel to the mount.

In some embodiments, the fastening body comprises a bolt configuration, preferably a wheel bolt. In this embodiment, the fastening body comprises a fastening bolt which includes a fastening head including the engagement portion and the elongate fastener, the elongate fastener being configured to be connected in the wheel mount, for example via a threaded connection. In these embodiments, the fastening body fastens to the mount through the elongate fastener element by the fastening bolt being fastened into the mount. In embodiments, the elongate fastener element section of the fastening bolt is threaded and is received within a complementary threaded aperture in the mount. However, it should be appreciated that other forms of interconnections are possible to connect/fix the fastening bolt to the mount.

In other embodiments, the fastening body comprises a fastening nut, for example a wheel nut. In these embodiments, the fastening nut is configured to be assembled onto the elongate fastener element to operatively engage the engagement portion thereof with the at least one engagement surface. In these embodiments, the elongate fastener element can comprise any suitable interlocking fastening arrangement with the fastening body. In a preferred form, the elongate fastener element includes an external threaded surface, and the fastening body includes a complementary threaded internal bore. In such embodiments, the elongate fastener element extends outwardly from the mount, preferably forming part of the mount. Here, the fastening body fastens to the mount through the elongate fastener element through the threaded internal bore of the fastening nut being received and fastened over the external threaded surface of the elongate fastener element.

In some embodiments, the composite wheel is of a centre lock type wherein the attachment aperture has a complementary thread to the elongate fastener element. The elongate fastener element can have an integrated threaded head.

The substantially complementary configuration of the engagement surface and the engagement portion function to facilitate force transfer between the engagement surface and the engagement portion. Preferably, the substantially complementary configuration has cooperating shaped surfaces that engage together. However, it should be appreciated that in some embodiments, this may involve cooperating designs where only part of the engagement portion directly contacts the corresponding area on the engagement surface. In this sense, the engagement between the engagement surface and the engagement portion does not require all or substantially all of the engagement portion to contact the engagement surface.

It should be appreciated that the engagement surface and the corresponding/cooperating engagement portion of fastening body can comprise a single surface or may comprise two or more separate or individual surfaces in the respective attachment insert and fastening body. For example, in some embodiments the engagement surface may comprise a ramped or curved surface which extends circumferentially within an inner surface of the insert section. In other embodiments, there could be two or more engagement surfaces within a single individual attachment insert, for example, two semi-circular surfaces extending from an inner surface of the insert section which are circumferentially spaced apart about the fastening axis by a gap, recess, projection or the like.

The engagement surface can extend from any portion of the inner surface of the insert section that is in a position to engage with the engagement portion of the fastening body when that fastening body is inserted into the bearing body and is fastened onto the elongate fastener element. Where the insert section has a circular cross-section, the engagement surface comprises a substantially annular portion of an inner wall of the insert section. In some embodiments, the engagement surface is angled or curved relative to the fastening axis. The angle or curved shape of the engagement surface can provide an additional feature that enables the force to be distributed away from the edge of a surface located about the attachment aperture and is more evenly distributed on the composite structure.

The engagement surface can have any suitable angle or curve relative to the fastening axis which allows the fastening body and bearing body to engage together and transfer compression force from this joint away from the fastening aperture. In some embodiments, the engagement angle is 90 degrees relative to the fastening axis. In other embodiments, the engagement surface is angled or curved relative to the fastening axis. Where the engagement surface is angled, the engagement surface can be angled between 10 and 80 degrees relative to the fastening axis. In some preferred embodiments, the engagement surface is angled between 30 and 60 degrees relative to the fastening axis. Where the engagement surface is curved relative to the fastening axis, the curve can be convex or concave relative to the fastening axis. In preferred forms, the curve has a radius of curvature which is equal to or less than the radius of the fastening aperture. In some embodiments, the engagement surface extends from a base position proximate the fastening aperture to a peak position at a location spaced radially away from the fastening aperture relative to the fastening axis.

The distal end of the insert section is designed to extend into the attachment aperture of the composite wheel and be spaced apart from the wheel mount, or from or in an element located in, on, integral with, or adjacent to the wheel mount. Preferably, the distal end of the insert section is designed to extend into the attachment aperture of the composite wheel and be spaced apart from a surface of the wheel mount, or from or in a surface of an element located in, on, integral with or adjacent to the wheel mount. In this sense, the distal end of the insert section is spaced apart from the wheel mount and/or said element such that the distal end of the insert section does not directly engage with, preferably does not directly contact the wheel mount and/or said element. This typically entails the distal end of the insert section not directly engaging with, preferably not directly contacting a proximate or adjoining surface of the wheel mount and/or said element. This spaced apart arrangement precludes, preferably prevents, that insert section from establishing or otherwise having direct force transfer with, through or onto the wheel mount and/or said element. That spacing may be an axial and/or radial spacing relative to the fastening axis from a surface of the wheel mount and/or said element located in, on or adjacent to the wheel mount. The spacing is therefore configured so that the distal end of the insert section does not directly contact or directly engage with a proximate or adjoining surface of the wheel mount or said element.

It should be understood that the wheel mount (or wheel hub) is the mounting element on a vehicle or other transport arrangement for the composite wheel. It should also be understood that said element, which is in, on, integral with or adjacent to the wheel mount may comprise an element that is formed integral with the wheel mount, is located on or in (within) the wheel mount, is attached to the wheel mount, or is located adjacent to the wheel mount. In some embodiments, said element comprises a backing plate which is located adjacent to the wheel mount. In embodiments, the element, for example a backing plate, may be located adjacent to but is spaced apart from the wheel mount.

In embodiments, the attachment arrangement may include a further component, such as a backing element, locating element, backing washer, clip such as a circlip or the like which locates the base of the insert section within the attachment aperture.

The attachment arrangement can further include at least one backing element configured to be inserted between the mount and the composite wheel. The backing element provides a large surface on the opposite side of the attachment aperture to the bearing body against which the composite wheel can be clamped by the attachment insert. The at least one backing element can include at least one section of the fastening aperture.

The distal end of the insert section is preferably configured to be received in an insert section aperture located in the wheel mount or the at least one backing element. The backing element can include at least one section of the insert section aperture, and preferably the entire insert section aperture. The insert section aperture is preferably sized to allow at least a portion of the insert section to move through the insert section aperture, preferably sized to provide a sliding fit between a portion of the distal end of the insert section and the at least one backing element. In some embodiments, the insert section aperture includes a stepped diameter that provides a first diameter sized to accommodate and seat the insert section therein, and a second diameter sized to accommodate the elongate element.

In some embodiments, the at least one backing element includes a recess sized to receive a portion of the insert section. The backing element can therefore be configured so that at least a portion of the at least one engagement surface is located within said recess of the at least one backing element. In some embodiments, said recess receives and encloses a distal end of the insert section. However, in other embodiments, the distal end of the insert section extends through the backing element. The insert section preferably includes a cutout section to provide clearance between the distal end of the insert section and a section of the surface of the backing element proximal the insert section aperture. This type of cutout section may comprise a step in the distal end of the insert section. The step preferably includes a base section facing the backing element configured to be spaced apart from the backing element.

In a preferred form, the backing element comprises a plate configured to abut a surface of the composite wheel about the attachment aperture. Where the composite wheel includes at least two fastening apertures, the backing element can include at least the same number of insert section apertures configured to cooperate with insert sections from respective bearing bodies inserted through each of these fastening apertures. For example, where the composite wheel is a wheel (for example a carbon fibre wheel) which attaches to a wheel mount using three or more wheel studs, the backing element can comprise an annular plate which includes a corresponding number of insert section apertures to the number of wheel studs.

It should be appreciated that in some embodiments, the backing element comprises a separate element in the attachment arrangement. However, in alternate embodiments the backing element may be formed by or in conjunction with another element, for example the mount. In some embodiments, the mount may provide some or all of the elements of the backing element.

The insert section of the present invention is designed to transfer the clamping force from the engagement surface though to the bearing body and base thereof. The insert section also functions to distribute the load away from the center of the fastening aperture and away from the walls of fastening aperture.

The insert section is configured to extend into and through the attachment aperture of the composite wheel and to be received in a complementary shaped insert section aperture located in the wheel mount or in an element located adjacent the mount. In some embodiments, the insert section aperture may be formed in the mount.

In embodiments, the base of the bearing body may include a fixing feature which substantially prevents axial rotation of the insert section relative to the wheel mount. This feature may comprise one of more projections, spigots, elongate, flanges or embossments that are seated in at least one complementary groove, hole, aperture, detent, recess or depression in the surface of the composite wheel. This anti-rotation feature ensures the attachment insert does not rotate in the attachment apertures of the composite wheel when the fastening body is being tightened.

In other embodiments, the insert section aperture and distal end of the insert section can have a complementary configuration in some forms which substantially prevents axial rotation of the insert section relative to the wheel mount. The complementary configuration can comprise any feature that provides a locked fit between the insert section and insert section aperture including (but not limited to) at least one of a polygonal shape, irregular shape, spline, flat, recess, shoulder, projection, spigot, key, cavity, groove or finger. In a preferred embodiment, the insert section aperture and distal end of the insert section have a complementary hexagonal shape.

As noted above, the insert section aperture is preferably sized to allow at least a portion of the insert section to move through the insert section aperture. The insert section aperture is preferably sized to provide a sliding fit between a portion of the distal end of the insert section and the backing element. In this sense, clearance is provided between this distal end of the insert section and the backing element to ensure the clamping load is transmitted from the engagement surface through the composite structure of the composite wheel and the backing element and into the vehicle wheel mount. The insert section can therefore be designed to provide a clearance between the bottom of the insert section and the surface surrounding the insert section aperture. In embodiments, this clearance can be designed to provide a sliding fit between the insert section and the element which includes the insert section aperture so that the insert section can slide through the insert section aperture when the attachment arrangement is compressed. This reduces the possibility of the insert section making contact with the mount and transferring some of the clamping load to the mount or radially within the attachment aperture and/or insert section aperture. It is preferable for all the compression loading from the fastener to go through the composite structure.

The distal end of the insert section is preferably spaced apart from that section of the surface the backing element proximal the insert section aperture. This spacing provides clearance between the distal end of the insert section and the backing element to allow a degree of expansion of the insert section within the attachment aperture once the fastening body is engaged within and creates a compression load in the attachment insert. In embodiments, the insert section may include a cutout section to provide clearance between the distal end of the insert section and a section of the surface the backing element proximal the insert section aperture. The cutout section can comprise any depression, groove or cavity configured to provide the required clearance. In one embodiment, the cutout section comprises a step in the distal end of the insert section. The step preferably includes a base section facing the backing element configured to be spaced apart from the backing element.

The insert section is preferably configured with a radial width relative to the fastening axis being smaller than the radial width relative to the fastening axis of the fastening aperture. This forms a radial gap between the outside of the insert section and the internal sides of attachment aperture. This reduces the possibility of the insert section transferring some of the clamping load to the walls of the attachment aperture and also provides clearance for a degree of expansion of the insert section within the attachment aperture once the fastening body is engaged within and creates a compression load in the attachment insert.

The thickness and width of the insert section must be sufficient to connect to the bearing body, include the fastening aperture and the at least one engagement surface, as well as provide sufficient material to accommodate force transfer from the engagement surface to the base of the bearing body. This can result in a significant outer diameter for the insert section. The distal end of the insert section therefore may include an extension section axially aligned with the fastening axis and fastening aperture configured to be received within the insert section aperture. In this way, the insert section aperture can be a smaller opening than the width of the main body of the insert section. In this sense, the radial size of the extension section is smaller than the radial size of the insert section relative to the fastening axis. The extension section can comprise a step in the distal end of the insert section where the radial size of the insert section reduces in size. However, it should be appreciated that in other embodiments the insert section aperture may be the same size or a larger opening than the width of the main body of the insert section.

The insert section can have any suitable cross-section. In preferred forms, the insert section has a circular or polygonal radial cross-section relative to the fastening axis. The bearing body and insert section are preferably integrally formed as the attachment insert from a single piece of material, such as metal which could be cast, forged or machined from billet. In other embodiments, the bearing body and insert section can be formed from two or more separate elements which can be secured together to form the attachment insert of the present invention.

The distal end of the insert section can include at least one retention feature which prevents withdrawal of the insert section through the insert section aperture of the backing element. This retention feature can be any element or formation. In one embodiment, the distal end of the insert section is inserted through the insert section aperture and a retention formation, for example a clip is fastened onto the distal end of the insert section. That retention formation can comprise any suitable fastening or fixing body, including a clip, peg, clamp, rod, pin, washer, or the like. For example, the retention formation can be a circlip, press fit washer or a deformation feature on the end of the insert section. In one embodiment, the retention formation comprises a fixing clip which is seated or otherwise fitted into a groove or trench included in a portion of this distal end of the insert section which extends through the attachment aperture. The outer diameter of the fixing clip has a greater size than the insert section aperture. This fixing clip is preferably arranged to still allow the insert section to slide relative to the backing element in one direction but prevents the whole assembly from falling apart when the fastener element is removed. In one embodiment, the distal end of the insert section is inserted through the insert section aperture and then the end is deformed to a greater size than the insert section aperture. This deformation can have any shape or configuration. In one embodiment, the distal edge is deformed to form a rolled edge.

The parts of the attachment arrangement including the fastening body, the attachment insert, the backing element and the like can be constructed of any suitable material. In many instances the attachment arrangement will be metallic, for example formed a steel or other iron-based alloy, or aluminium or an aluminium based alloy. Depending on the metal, corrosion protection may be required. Low corrosion metals such as stainless steel or titanium may be used. Other metals may need more robust corrosion protection, for example, a corrosion protection coating applied to part or all of the metal components. Carbon steel may be used with corrosion protection such as painting or powder coating. Aluminium alloy can be protected for example using hard anodising according to military specification MIL-A-8625F.

The composite wheel of the present application can have any suitable composition. In exemplary embodiments, the composite wheel comprises a carbon fibre composite wheel.

A second aspect of the present invention provides a composite wheel fitted with the attachment arrangement of the first aspect of the present invention. This arrangement includes the fastening body which includes the elongate fastener element or can be fastened to the elongate fastener element of a wheel mount of a vehicle. The fastening body has an engagement portion having a substantially complementary configuration to the engagement surface. In use, the engagement portion of the fastening body engages with the engagement surface when the fastening body fastens to the mount through the elongate fastener element to fasten the composite wheel between the bearing body and the wheel mount.

Again, it should be appreciated that the substantially complementary configuration of the engagement surface and the engagement portion function to facilitate force transfer between the engagement surface and the engagement portion. Preferably, the substantially complementary configuration has cooperating shaped surfaces that engage together. However, it should be appreciated that in some embodiments, this may involve cooperating designs where only part of the engagement portion directly contacts the corresponding area on the engagement surface. In this sense, the engagement between the engagement surface and the engagement portion does not require all or substantially all of the engagement portion to contact the engagement surface.

The attachment arrangement is preferably fitted to the composite wheel preloaded in tension between the at least one engagement surface and the base of the bearing body. The composite wheel preferably includes at least two fastening apertures, and the backing element includes at least two insert section apertures configured to cooperate with insert sections from respective engagement bodies inserted through each of the at least two fastening apertures.

The composite wheel fastened using the attachment arrangement can be any composite material in which compression joint damage can occur, for example, a fibre reinforced composite such as (but not limited to) a carbon fibre composite material or carbon/epoxy composite. It should however be understood that other types of composite materials other than carbon fibre and epoxy resin could be used in the composite wheels of the present invention which use the same joint. One preferred application is for attaching the composite wheel to a wheel mount, and more preferably one or more carbon fibre composite wheels.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
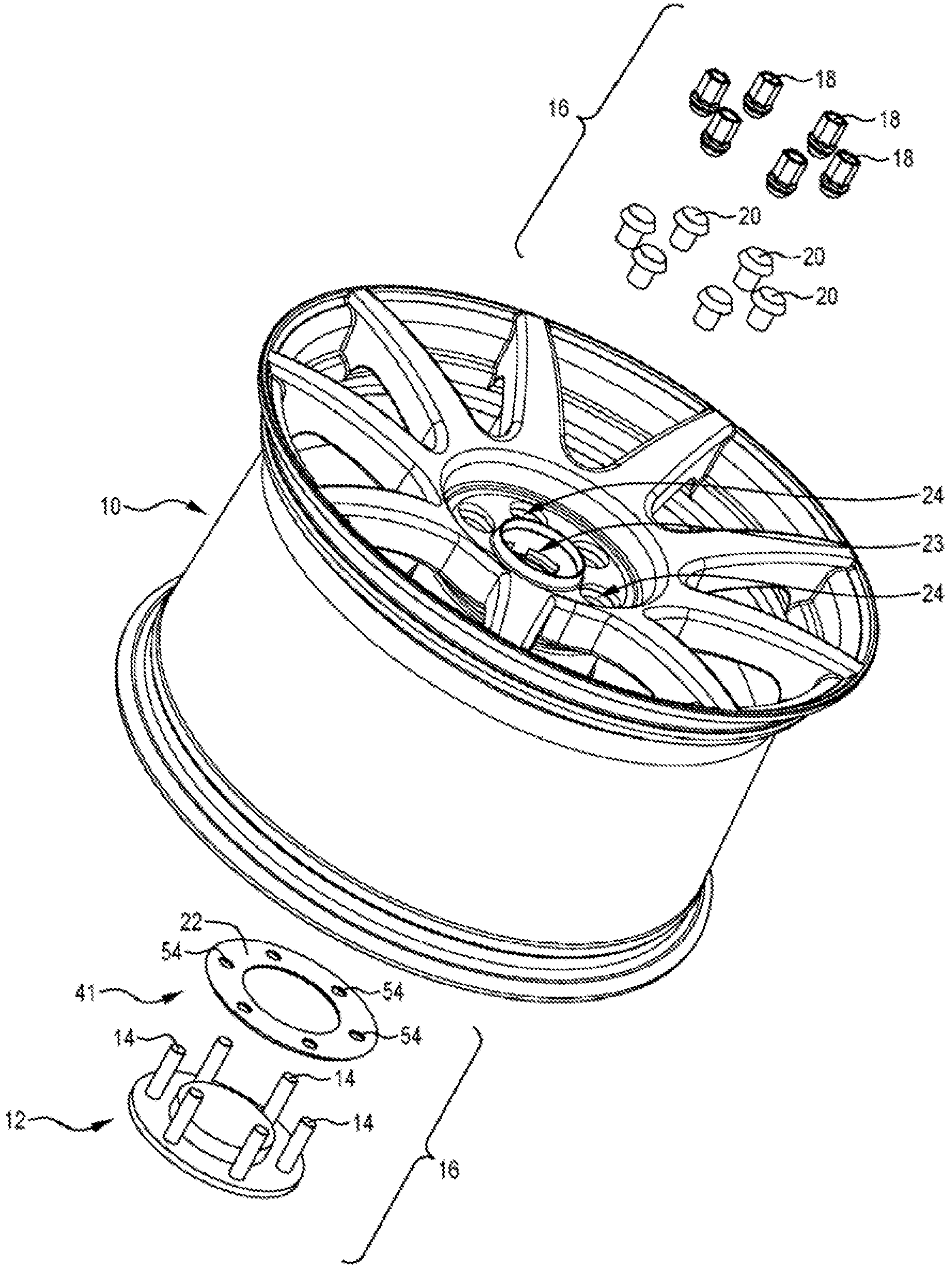
FIG. 1 provides a perspective construction view of a carbon fibre wheel, wheel mount and wheel attachment arrangement which connects the wheel to the wheel mount according to a first preferred embodiment of the present invention.

FIG. 1 illustrates a carbon fibre composite wheel 10 which is attached to a wheel mount (or wheel hub) 12 through wheel studs 14 using an attachment arrangement 16 according to an embodiment of the present invention. The illustrated attachment arrangement 16 comprises fastening nuts 18 which can be fastened onto the wheel studs 14, attachment inserts 20 and a backing plate 22.

The illustrated composite wheel 10 is a one-piece carbon fibre wheel, for example as described in International Patent Publication WO2010/025495A1 and International Patent Publication No. WO2019/033169A1, the contents of which should be understood to be incorporated into this specification by this reference. The hub portion 23 of the illustrated composite wheel 10 includes six attachment apertures 24 through which the wheels studs 14 of the wheel mount 12 are inserted when the wheel 10 is mounted on the wheel mount 12. Each of the wheel studs 14 are an elongate externally threaded pin having a complementary thread to a threaded internal bore 25 (FIG. 3) of each of the fastening nuts 18.

Whilst the illustrated wheel has six attachment apertures 24, it should be appreciated that a composite wheel using the attachment arrangement of the present invention may have any number of attachment apertures, for example three, four, five, six or more.

Figure 2:
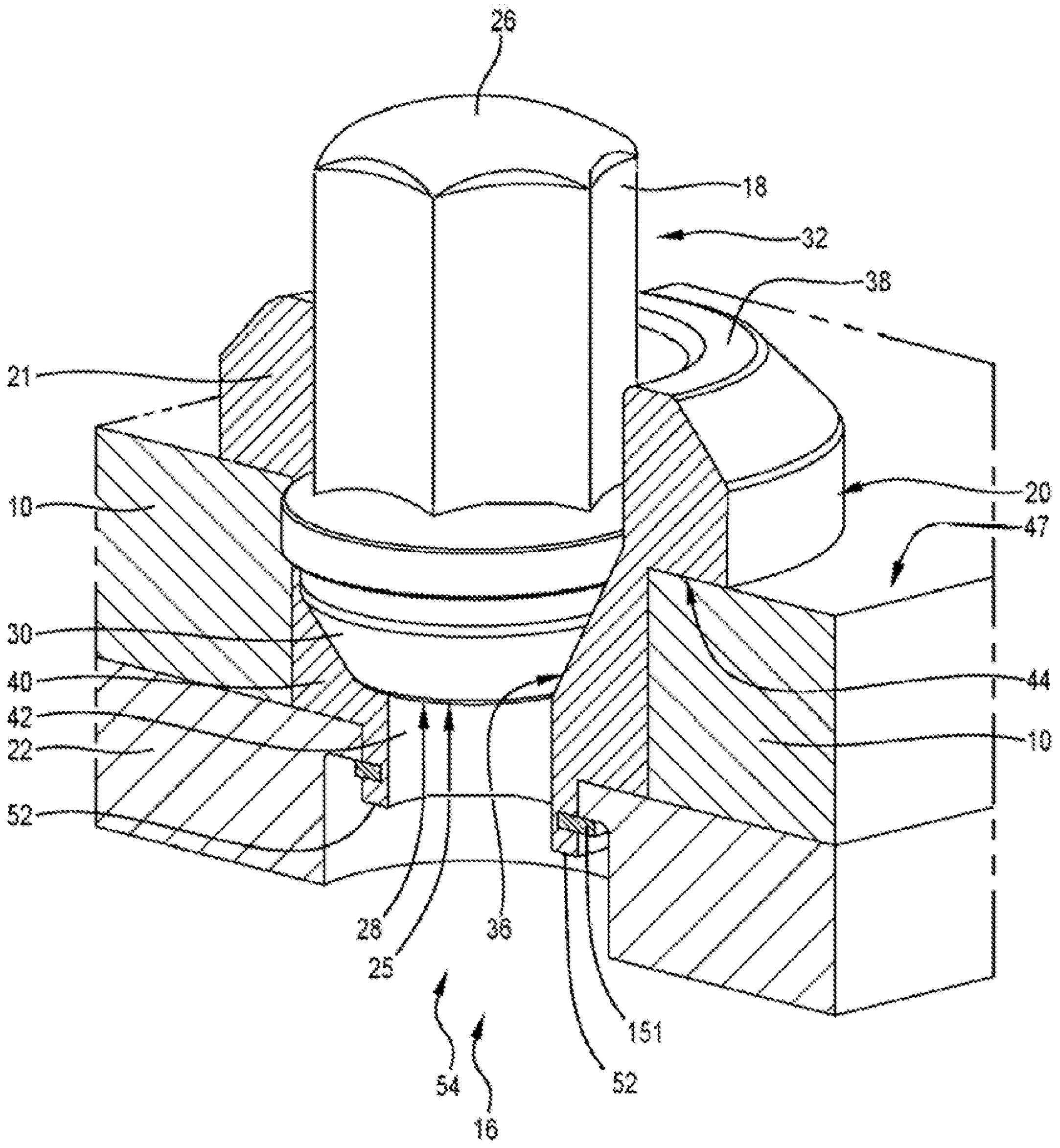
FIG. 2 provides an enlarged cross-sectional perspective view of a portion of the wheel attachment arrangement shown in FIG. 1.
Figure 3:
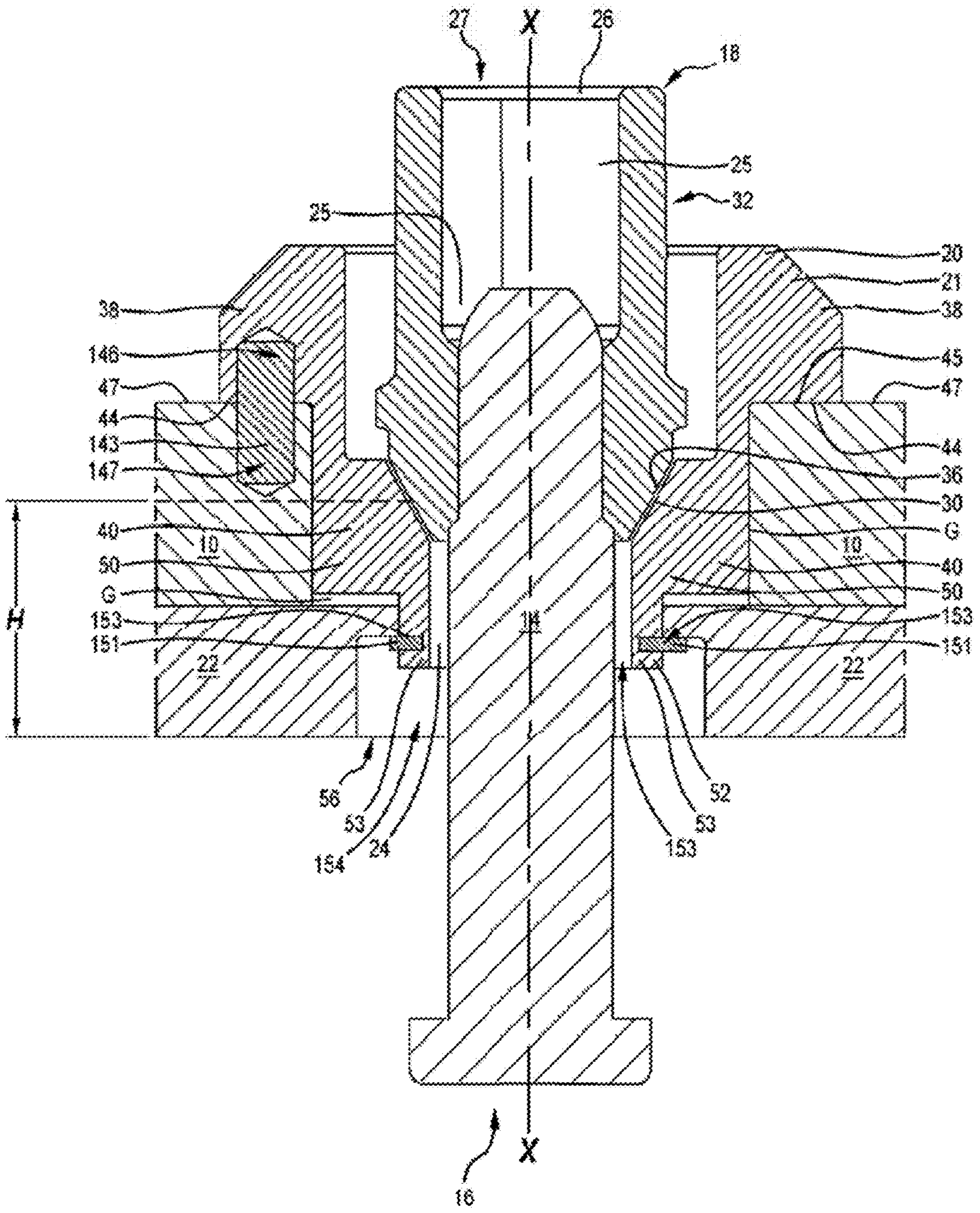
FIG. 3 provides a front elevation cross-section of the attachment arrangement shown in FIG. 2.

As best shown in FIGS. 2 and 3, each fastening nut 18 is a cylindrical cap including a top 26 and a base 28 which annularly extends around the internal bore 25. The internal bore 25 includes a central fastening axis X (FIG. 3). Each fastening nut 18 has an angled engagement portion 36 which extends from the edge of the internal bore 25 (FIG. 3) to the outer radial side 32 of the fastening nut 18. The engagement portion 36 has a substantially complementary angle β (FIG. 4) relative to the fastening axis X to an engagement surface 30 of the attachment insert 20. It should be appreciated that in other embodiments the engagement portion 36 and engagement surface 30 can be flat, being angled 90 degrees relative to the fastening axis X or have a substantially complementary concave or convex curve.

Typically, the angle β can be between 10 and 80 degrees, and more preferably between 30 and 60 degrees. In the illustrated embodiment, the angle β is 45 degrees. The angle β can be between 10 and 80 degrees, and more preferably between 30 and 60 degrees. In the illustrated embodiment, the angle β is 45 degrees.

As best illustrated in FIGS. 2 and 3, the attachment insert 20 comprises two main sections:

(A) A bearing body 21 which comprises a generally toroid shaped head 38—similar to a fastening washer; and (B) an axially extending cylindrical insert section (sleeve) 40.

The bearing body 21 and insert section 40 are preferably integrally formed from a single piece of material, such as metal, which could be cast, forged or machined from billet.

A fastening aperture 42 extends axially through length of the attachment insert 20. The fastening aperture 42 also includes a central fastening axis X. The fastening axis X of the fastening aperture 42 and internal bore 25 of the fastening nut 18 are aligned when the bearing body 21 and nut are in use, as shown in FIG. 3. In use, the fastening aperture 42 receives a wheel stud 14 of the wheel mount 12 (FIG. 1).

The bearing body 21 is used to distribute clamping force F (FIGS. 4 and 5) across the surface 47 of the composite wheel 10 around the attachment aperture 24. To achieve this, the head 38 of the bearing body 21 includes a substantially flat base 44 configured to face and abut the surface of the composite wheel 10 about the attachment aperture 24. The head 38 of the bearing body 21 is therefore configured to provide an increased clamping contact area with the load transfer zone 45 of the surface 47 of the composite wheel 10 surrounding the attachment aperture 24 and thereby increase the area through which the clamping force is applied to that area.

Additionally, the bearing body 21 is configured to receive the fastening nut 18 in nut aperture 27 so that the engagement portion 36 of the fastening nut 21 engages with the engagement surface 30 in insert section 40. The nut aperture 27 comprises a circular or polygonal shaped recess sized to accommodate the fastening nut 18, with some clearance, to allow the fastening nut 18 to be manipulated in that recess. In some embodiments, that clearance is sufficient to also accommodate a portion of tool (not illustrated) used to manipulate the fastening nut 18, for example a socket wrench or spanner. As shown in FIG. 3, the nut aperture 27 forms a recess that then steps into the fastening aperture 42.

The insert section 40 of the bearing body 21 is designed to transfer the clamping force from the engagement surface 30 through to the bearing body 21 and base 44 thereof. The insert section 40 also functions to distribute the load away from the center of the fastening aperture 42 and away from the walls of fastening aperture 42.

The insert section 40 extends axially outwardly from the base 44 of the head 38 of the bearing body 21 about the fastening aperture 42. The insert section 40 is configured to extend into an attachment aperture 24 of the composite wheel 10. The radial cross-section of body 50 of the insert section 40 is circular. Furthermore, the radial width of the body 50 of the insert section 40 is smaller than the radial width of the attachment aperture 24. This forms a radial gap G (FIG. 4) between the outside of the body 50 of the insert section 40 and the internal sides of attachment aperture 24 in the composite wheel 10. This reduces the possibility of the insert section 40 transferring some of the clamping load to the walls of the attachment aperture 24 and also provides clearance for a degree of expansion of the insert section 40 within the attachment aperture 24.

The thickness and radial width of the insert section 40 is sufficient to connect to the nut aperture 27 of the bearing body 21, accommodate the fastening aperture 42 and the engagement surface 36, as well as provide sufficient material to enable force transfer from the engagement surface 30 to the base 44 of the bearing body 21. This can result is a significant outer diameter for the insert section 40. The distal end 52 of the insert section 40 therefore includes a smaller diameter extension section 53 which is axially aligned with the fastening axis X and fastening aperture 42 which is specifically configured to be received within the insert section aperture 54 of the backing plate 22 (see below). The extension section 53 effectively provides a step in the distal end 52 of the insert section 40 where the radial size of the insert section 40 reduces in size to match the size of the insert section aperture 54 of the backing plate 22. Additionally, it should be noted that the distal end 52 of the insert section 40 at a spaced apart location from the surface of the wheel mount 12.

The insert section 40 includes an angled annular engagement surface 30 formed in an inner/internal surface of the insert section 40. As noted above, the engagement surface 30 has a complementary angle (β) relative to the fastening axis X to the base engagement portion 36 of the fastening nut 18. In use, the engagement portion 36 of the fastening nut 18 engages with the engagement surface 30 of the bearing body 21 when the fastening nut 18 is assembled on a wheel stud 14 to fasten the composite wheel 10 between the bearing body 21 and the wheel mount 12.

As previously noted, the positioning of the engagement surface 30 in the insert section 40 (formed in the inner wall thereof) enables the fastening nut 18 to be recessed through the bearing body 21 and into the insert section 40. This configuration positions the fastening nut in a lower position than if the engagement surface 30 was located within the bearing body 21. The engagement portion 36 of the fastening nut 18 and the engagement surface 30 of the insert section 40 are positioned below the base 44 of the bearing body 21 and below the top surface level 47 of the composite wheel. This positioning enables the attachment arrangement to accommodate shorter elongate fasteners (wheel studs) compared to the arrangement taught in WO2013/000009A1, therefore accommodating a smaller stack height H (FIG. 3) than possible in the arrangement taught in WO2013/000009A1. This provides the advantage of retaining standard vehicle wheel stud lengths and wheel nut designs when attaching a composite wheel 10 to the wheel mount 12 of a vehicle (not illustrated).

Figure 5:
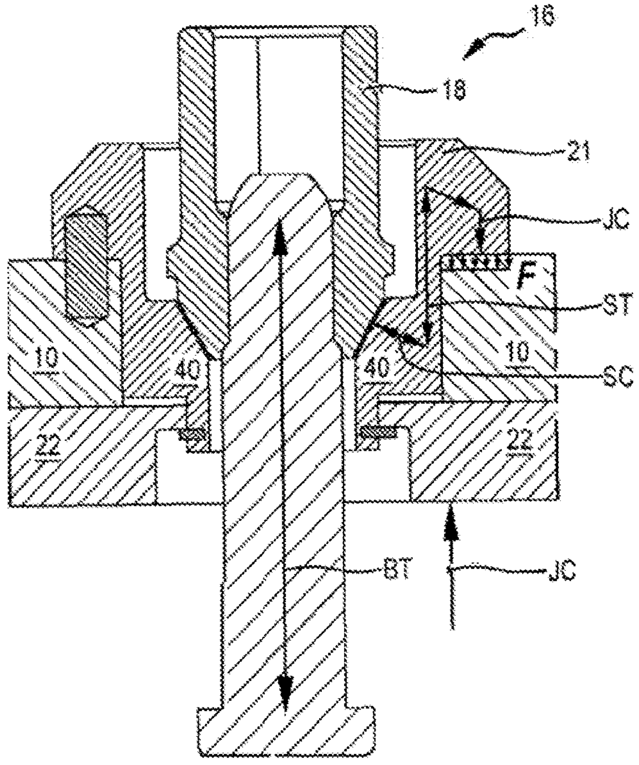
FIG. 5 provides a further front elevation cross-section of the wheel attachment arrangement shown in FIG. 2 illustrating the transfer of forces within the arrangement.

The arrangement of the engagement surface 30 within the insert section 40 locates the clamping engagement force between the engagement portion 36 of the fastening nut 18 and the engagement surface 30 of the insert section 40 below the base 44 of the bearing body 21 and the surface 47 of the composite wheel 10 around the attachment aperture 24. The attachment insert 20 is configured to project the compressive force from that clamping engagement outwards from the engagement surface 30 and axially (relative to fastening axis X) back up the insert section 40, and to the base 44 of the bearing body 21. As best shown in FIG. 5, this indirectly creates a compression force JC between the base 44 of the bearing body 21 and the backing plate 22, sandwiching the material of the composite wheel 10 together between the base 44 of the bearing body 21 and the backing plate 22 thereby securely fastening the wheel 10 onto the wheel mount 12.

As shown best in FIG. 5, the transfer of forces results from the fastening nut 18 being is fastened onto the end of the wheel stud 14 (creating tension BT in the wheel stud 14). Tightening of the fastening nut 18 on the wheel stud 14 engages the engagement portion 36 of the fastening nut 18 onto the engagement surface 30 creating a compression force SC on the engagement surface 36, which is transferred into the adjoining portion of the insert section 40. This in turn creates a tension force ST between the engagement surface 30 and the bearing body 21, which in turn applies a compression force JC from the base 44 of the bearing body 21 onto the surface 47 of the composite wheel 10 around the attachment aperture 24.

Figure 4:
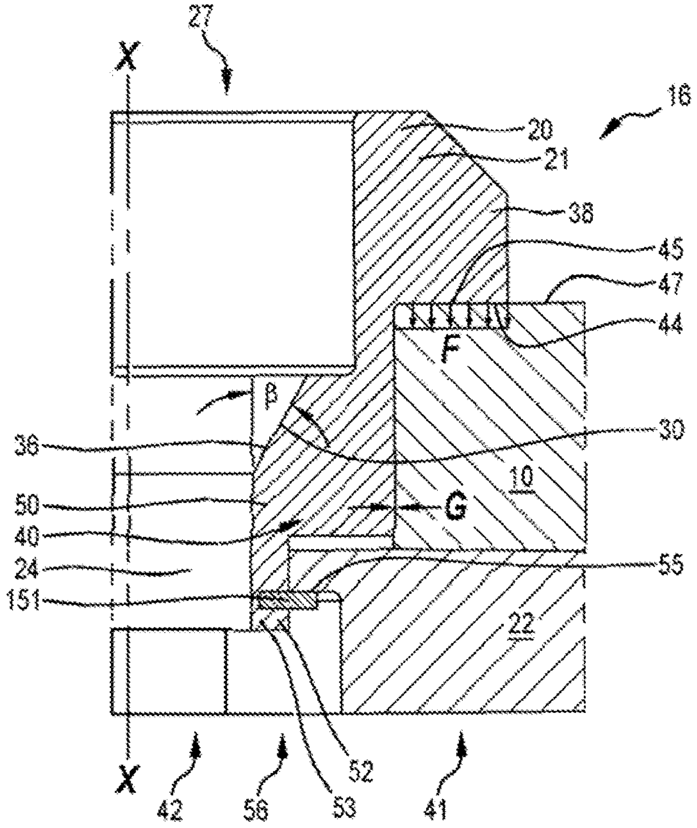
FIG. 4 provides a further front elevation cross-section of the wheel attachment arrangement shown in FIG. 2 providing closer view of the sleeve of the arrangement.

Finally, as shown in FIGS. 4 and 5, the transfer of forces from the engagement surface 30 through the insert section to the bearing body 21 ensures that the force F is distributed away from the edge of the attachment aperture 24 and is more evenly distributed across the composite surface in a load transfer zone 45 and then on and through the composite structure around the attachment aperture 24.

As best shown in FIGS. 2 and 3, the backing plate 22 is designed to be inserted between the wheel mount 12 and the composite wheel 10. The illustrated backing plate 22 is a flat toroid plate which includes six annularly spaced apart insert section apertures 54. The backing plate 22 provides a large surface on the opposite side of the attachment aperture 24 to the bearing body 21 against which the composite wheel 10 can be clamped by compression force JC (FIG. 5). The illustrated insert section apertures 54 have a generally circular shape designed to receive but not interlock with the distal end 52 of the insert section 40 section of the bearing body 21. Rotation of the bearing body 21 is prevented by an insert rod 143 inserted within a recess 146 in the base 44 of the head 38 of the bearing body 21, and projecting axially out therefrom, which is received and seated in a complementary recess 147 in the surface of the composite wheel 10.

In alternate embodiments (not illustrated), the distal end 52 of each insert section 40 can be configured to be received in a complementary shaped insert section aperture 54 formed in the backing plate 22, for example a complementary hexagonal shape. This complementary shape substantially prevents axial rotation of the insert section 40 relative to the wheel mount 12.

As shown in FIGS. 3 and 4, the rear side 41 of the backing plate 22 includes a series of recesses 56 which are concentrically arranged with each of the insert section apertures 54. The recesses 56 shorten the length of insert section apertures 54 in the backing plate 22, enabling the insert a shorter insert section 40.

The insert section 40 of the bearing body 21 is preferably not bonded to the composite wheel 10 in any way. This allows the insert section 40 to slide relative to the attachment aperture 24 in the composite wheel 10.

The insert section aperture 54 is sized to allow at least a portion of the distal end 52 of the insert section 40 to move through the insert section aperture 54. In some arrangements, the clearance can be tailored to produce a sliding fit between the insert section 40 and the backing plate 22 allowing the distal end 52 of the insert section 40 to slide through the insert section aperture 54 when the attachment arrangement 16 is compressed. This reduces the possibility of the insert section 40 contacting the mount 12 and transferring some of the clamping load to the mount 12 or radially within the attachment aperture 24 or insert section aperture 54. However, it should be understood that the distal end 52 of the insert section 40 does not directly engage or contact (radially or axially relative to axis X-X) any part of the wheel mount 12 (FIG. 1) or the backing plate 22.

The distal end 52 of the insert section 40 is inserted through the insert section aperture 54 and then the end is fixed in place using a circlip or other fixing clip 151, fitted into a groove or trench 153 included in a portion of this distal end 52 of the insert section 40 which extends through the attachment aperture 24. The outer diameter of the fixing clip 151 has a greater size than the insert section aperture 54. It should be appreciated that this retention formation can be in any suitable such as a circlip (as illustrated), press fit washer or a deformation feature on end of the insert section 40. The fixing clip 151 can be seated in a complementary annular groove 55 (FIG. 4) provided in the base of the backing plate 22.

In other embodiments (not illustrated), the retention formation can be formed at the distal end 52 of the insert section 40 through deformation of the distal end 52 for example to form a rolled edge after the distal end 52 of the insert section 40 is inserted through the insert section aperture 54, so that it has a greater size than the insert section aperture 54. The rolled edge can be seated in a complementary annular groove 55 provided in the base of the backing plate 22. The arrangement still allows the insert section 140 to slide through the insert section aperture 154 relative to the backing plate 122 in one direction but prevents the whole attachment arrangement 116 from falling apart when the fastener element is removed.

As noted above, clearance can also be provided between this distal end 52 of the insert section 40 and backing plate 22 to ensure clamping load is transmitted from the engagement surface 30 through the carbon composite laminate 11 of composite wheel 10 and backing plate 22, and into the vehicle wheel mount (not illustrated).

The arrangement allows the insert section 40 to slide through the insert section aperture 54 relative to the backing plate 22 in one direction as well as preventing the whole attachment arrangement 16 from falling apart when the fastener element is removed.

Figure 6:
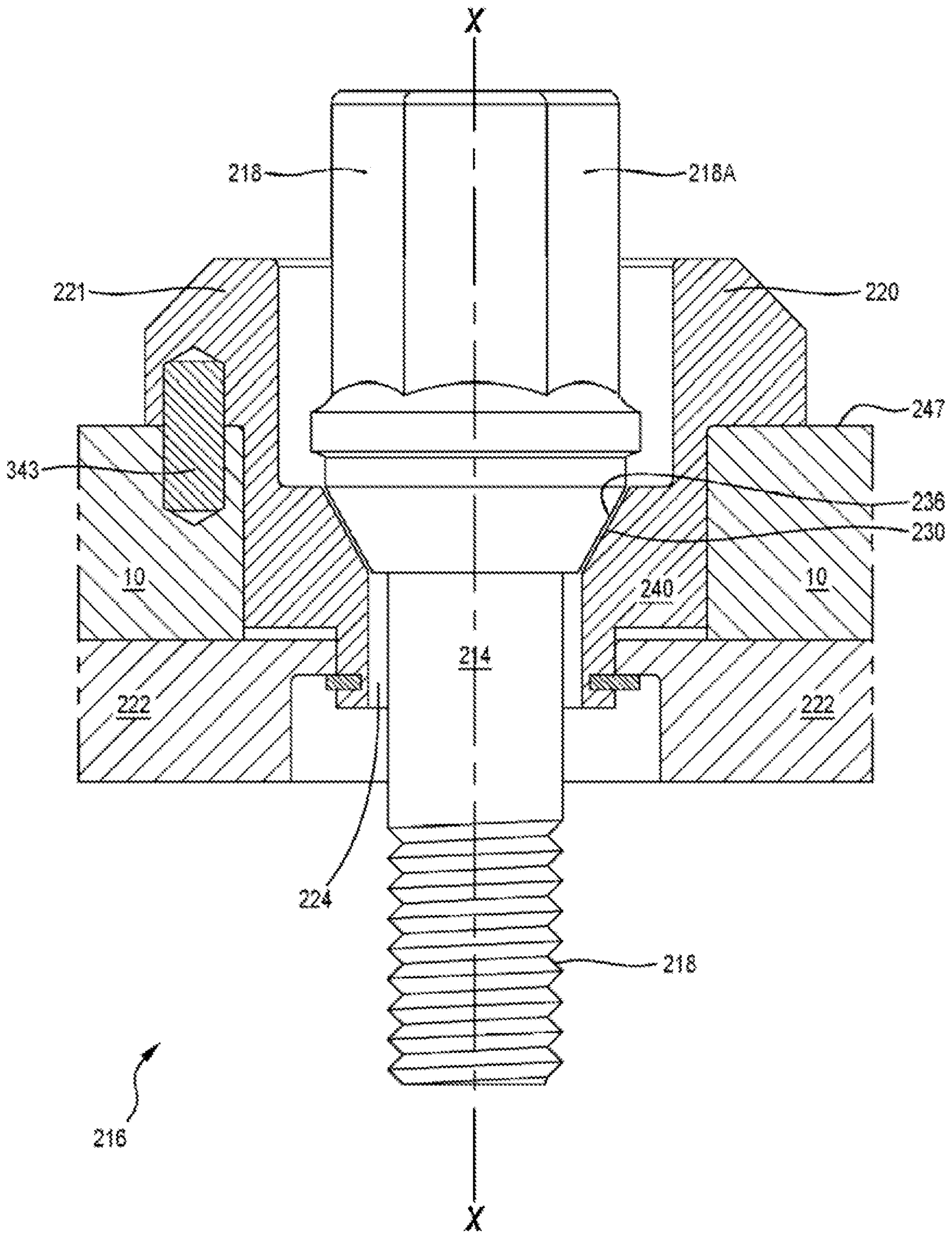
FIG. 6 provides front elevation cross-section of a second wheel attachment arrangement in accordance with the present invention which uses a wheel bolt to attach the composite wheel to a wheel mount.

FIG. 6 illustrates an embodiment of the attachment arrangement 216 according to the present invention that uses a wheel bolt 218 to mount the composite wheel 10 onto a wheel mount 12. Whilst not illustrated, it should be appreciated that the wheel bolt 218 includes a threaded elongate fastener section 214 and a bolt head 218A. The elongate fastener section 214 is inserted through the attachment aperture 224 of the composite wheel 10, which is then fastened into a complementary threaded aperture in the wheel mount 12 to attach or otherwise fix the composite wheel 10 to the wheel mount 12.

In this embodiment, the bolthead 218A of wheel bolt 218 includes all the features of each fastening nut 18 of the previous embodiment, with the exception that the wheel bolt 218 is integrally formed with the threaded elongate fastener section 214. Accordingly, the function and force transfer of this embodiment is exactly the same as described above for the preceding embodiment, with the exception that an angled engagement portion 236 is located in the bolt head 218 of the wheel bolt, and that engagement portion 236 is configured to engage with the engagement surface 230 of the attachment insert 220. A number of features of the attachment insert 220 shown in FIG. 6 are the same as those shown and described in relation to the embodiment shown in FIGS. 1 to 5. Like features in FIG. 6 have therefore been provided with the same reference numerals as shown in FIGS. 1 to 5 PLUS 200. It should be understood that the above description of the operation of the attachment arrangement 16 shown in FIGS. 1 to 5 equally applies to this embodiment, with the exception that the attachment arrangement 216 is tightened by engagement of the wheel bolt 218A in an aperture in the wheel mount 12 as opposed to fastening the fastening nut 18 on wheel stud 18. Thus, attachment insert 220 is formed from bearing body 221 and insert section 240 as previously described for the embodiment shown and describe in relation to FIGS. 1 to 5 and has the same features and function as previously described which interact with the wheel bolt 218.

Figure 7:
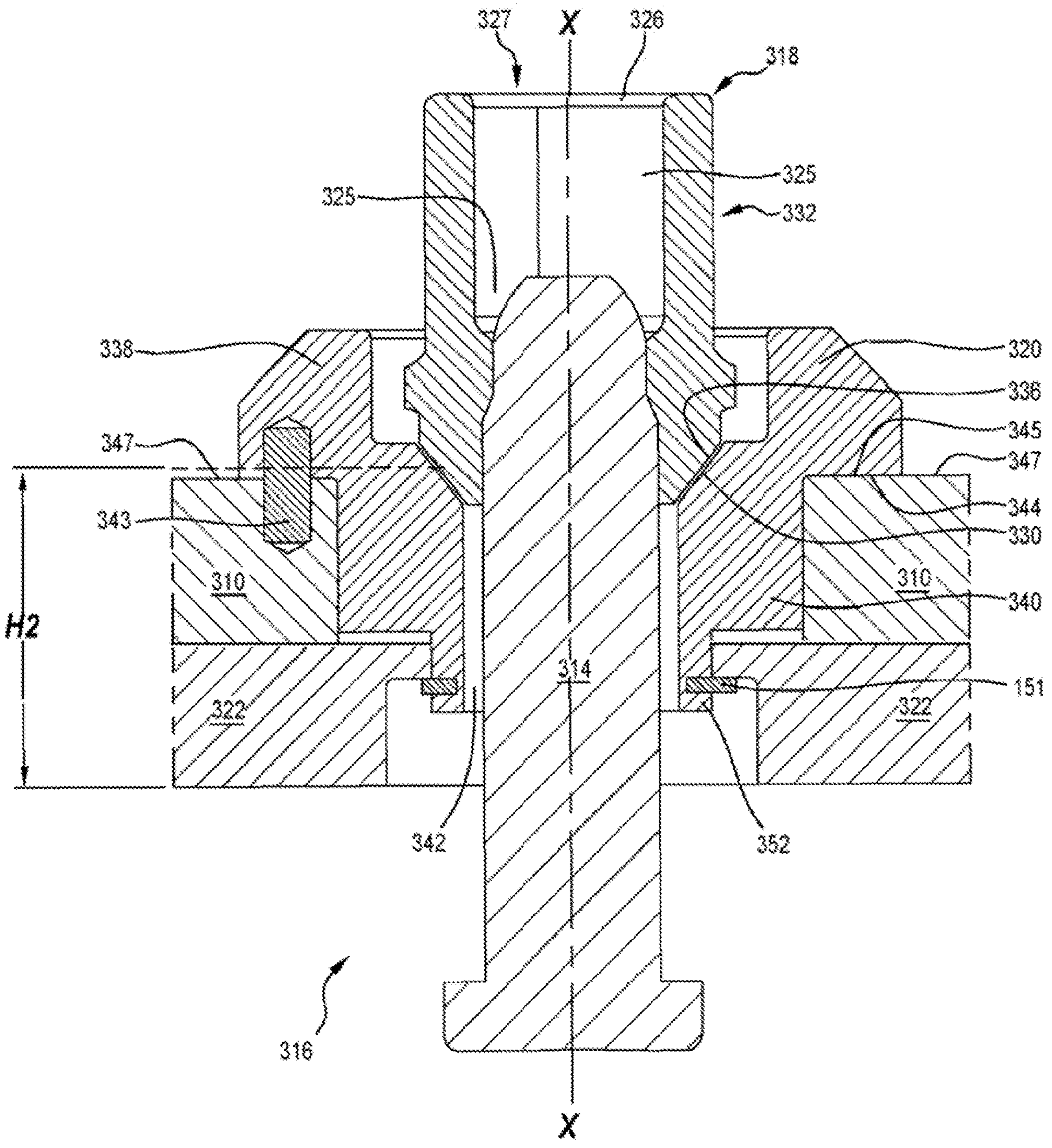
FIG. 7 provides front elevation cross-section of a third wheel attachment arrangement in accordance with the present invention in which part of the engagement surface is located above the surface of the composite wheel.

FIG. 7 illustrates an embodiment of the attachment arrangement 316 according to the present invention where an upper portion of the engagement surface 330 is located above the top-level surface 322 of the composite wheel 310. A number of the features of the attachment arrangement 316 shown in FIG. 7 are the same as those shown and described in relation to the embodiment shown in FIGS. 1 to 5. Like features in FIG. 7 have therefore been provided with the same reference numerals as shown in FIGS. 1 to 5 PLUS 300. It should be understood that the above description of the operation of the attachment arrangement 16 shown in FIGS. 1 to 5 equally applies to this embodiment, with the exception of the positioning of the engagement surface 330 in the insert section 340. In this embodiment, the engagement surface 330 is still formed in the inner wall of the insert section. However, the location of the engagement surface 330 is higher relative to the surface 347 of the composite wheel 310, with a portion of the engagement surface 330 located axially above the surface 347 of the composite wheel 310 relative to axis X-X. The distal end 352 of the insert section 340 is at a spaced apart location from the surface of the wheel mount 12 (FIG. 1). In this sense, the distal end 352 of the insert section 340 does not directly engage or contact (radially or axially relative to axis X-X) any part of the wheel mount 12 (FIG. 1) or the backing plate 322.

As shown in FIG. 7, this positioning enables the attachment arrangement to accommodate shorter elongate fasteners (wheel studs or bolts) compared to the arrangement taught in WO2013/000009A1, therefore accommodating a smaller stack height H2 (FIG. 7) than possible in the arrangement taught in WO2013/000009A1. However, in this case, the stack height of this embodiment is much greater than the stack height H (FIG. 3) of the previous embodiment.

Fastening nut 318 is still received and recessed into the insert section 340 of bearing body 321 within nut aperture 327. In this embodiment, the fastening nut sits axially higher compared to the previous embodiment, this still enables the fastening nut 318 to be recessed through the bearing body 321, but not completely into the insert section 340.

FIGS. 8 to 11 illustrate an embodiment of the attachment arrangement 416 according to the present invention that includes a shared bearing body 421.

A number of the features of the attachment arrangement 416 shown in FIGS. 8 to 11 are the same as those shown and described in relation to the embodiment shown in FIGS. 1 to 5. Like features in FIGS. 8 to 11 have therefore been provided with the same reference numerals as shown in FIGS. 1 to 5 PLUS 400. It should be understood that the above description of the operation of the attachment arrangement 16 shown in FIGS. 1 to 5 equally applies to this embodiment, with the exception of the configuration of the bearing body 421 and insert section (sleeve) 440.

Figure 8:
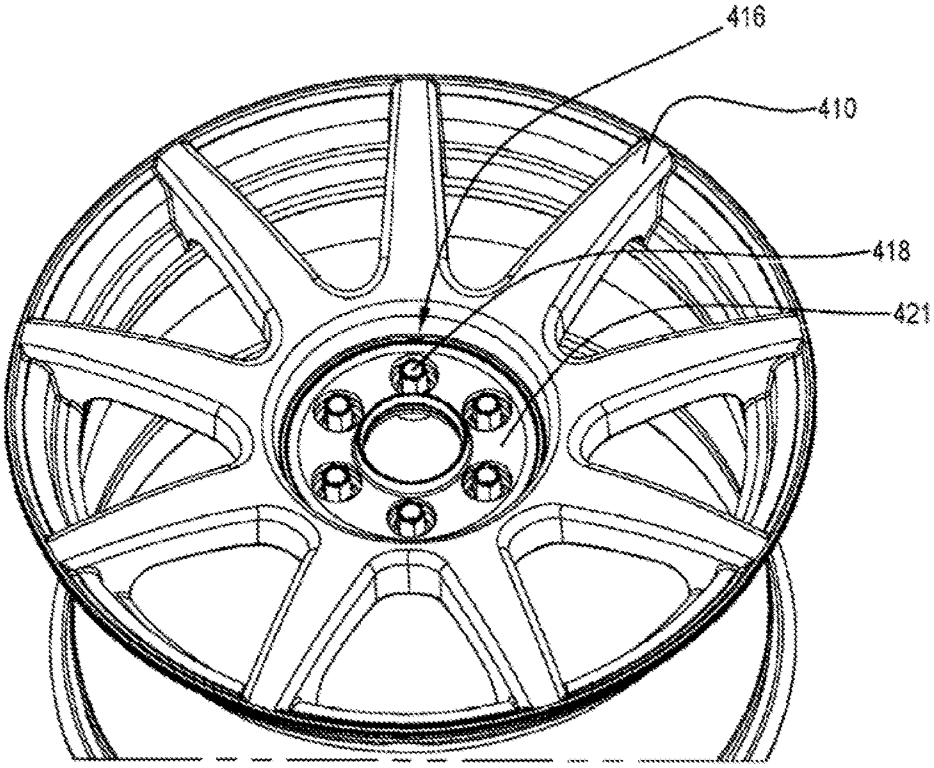
FIG. 8 provides a top perspective view of a fourth wheel attachment arrangement in accordance with the present invention that includes a shared bearing body comprising a single piece front plate.
Figure 9:
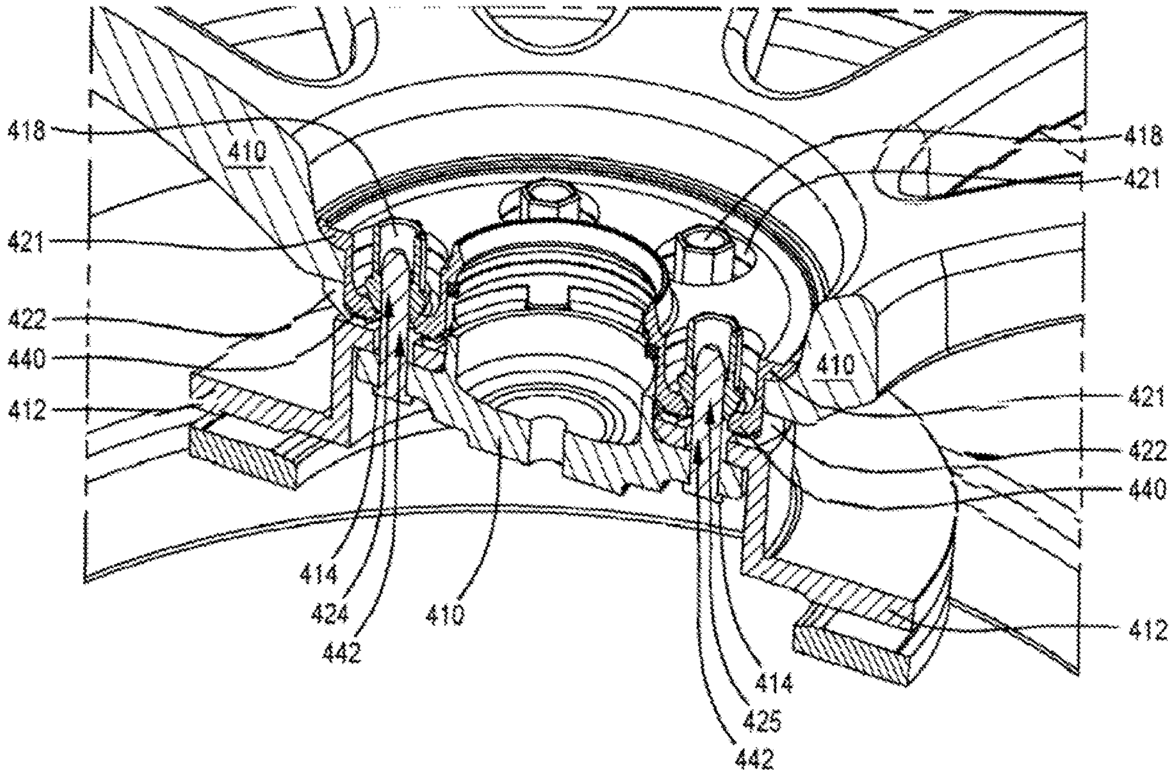
FIG. 9 provides a cross-sectional perspective view of the wheel arrangement shown in FIG. 8 illustrating the stacking arrangement of the bearing body and backplate.

As best illustrated in FIGS. 8 and 9, the attachment insert 420 comprises two main sections:

(A) the bearing body 421 which comprises a single piece front plate extending over and around each of the attachment apertures 424 of the composite wheel 410; and (B) a plurality of axially extending cylindrical insert sections 440 which are configured to extend into each attachment aperture 424.

The attachment insert 420 also includes fastening apertures 442 for each attachment aperture 424 in the composite wheel 410.

The bearing body 421 and each insert section 440 of the attachment insert 420 are preferably integrally formed from a single piece of material, such as metal, which could be cast, forged or machined from billet.

Figure 10:
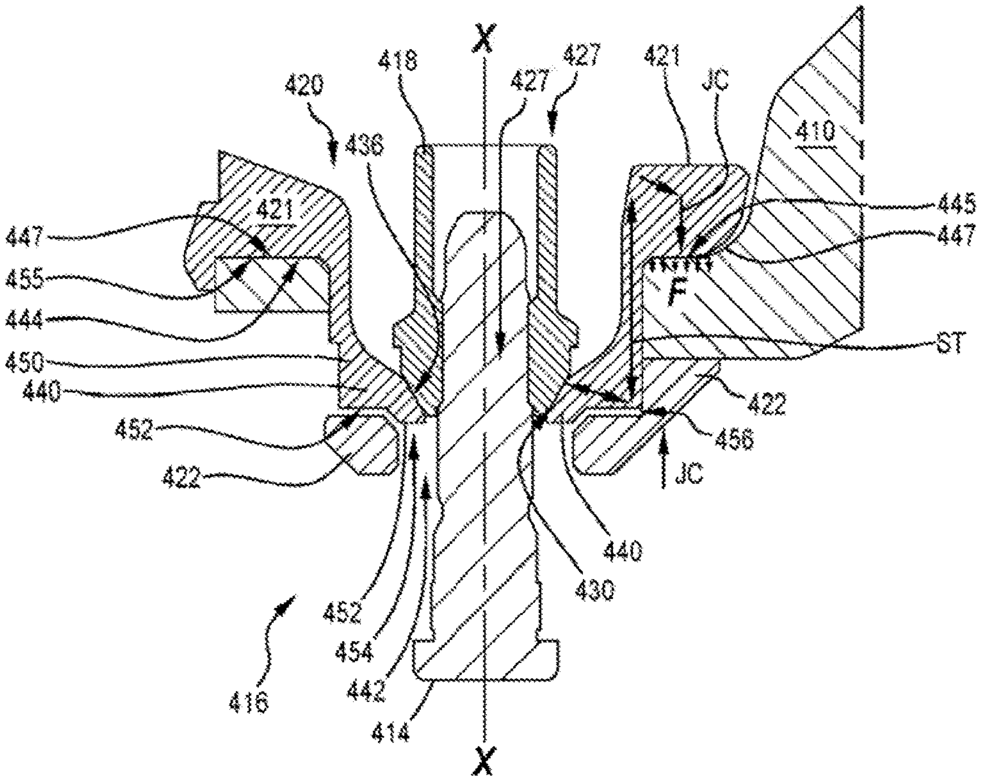
FIG. 10 provides a front elevation cross-section of the wheel attachment arrangement shown in FIGS. 8 and 9 illustrating the transfer of forces within the arrangement.

As with the previous embodiments, a fastening aperture 442 extends axially through each insert section 440 about a central fastening axis X (FIG. 10). The fastening axis X of the fastening aperture 442 and internal bore 425 of the fastening nut 418 are aligned in use, as shown in FIG. 10. In use, each fastening aperture 442 receives a wheel stud 414 of the wheel mount (for example wheel studs 14 of wheel mount 12 in FIG. 1).

The bearing body 421 is again used to distribute clamping force F (FIG. 10) across the surface 447 of the composite wheel 410 around each attachment aperture 424. In this embodiment, the bearing body 421 comprises a top plate configured to extend over the surface 447 of the composite wheel 410 between and around each of the attachment apertures 424. The bearing body 421 is therefore configured as a shared body that provides an increased clamping contact area 445 with the surface 447 of the composite wheel over the surface of the composite wheel around each of the attachment apertures 424. Once again, the bearing body provides a flat base surface 444 configured to face and abut the surface of the composite wheel 10 about each attachment aperture 424—but in this case with that base surface 444 extending between and about each attachment aperture 424. Each fastening aperture 442 includes a recessed portion comprising a nut aperture 427 in the bearing body 421 which comprises a circular or polygonal shaped recess sized to accommodate the fastening nut 418, with some clearance, to allow the fastening nut 418 to be manipulated in that recess. The nut aperture 427 leads directly into the insert section 440 of the bearing body 421.

As best illustrated in FIGS. 9 and 10, each insert section 440 extends axially outwardly from the base 444 of the bearing body 421 about the fastening aperture 442 into and through the respective attachment apertures 424 of the composite wheel 410. The radial cross-section of body 450 of the insert section 440 is circular, and preferably has a radial width smaller than the radial width of the attachment aperture 424. The distal end 452 of the insert section 440 is configured to be received within an insert section aperture recess 456 of the backing plate 422 (see below).

The insert section 440 includes an angled annular engagement surface 430 formed in an inner/internal surface of the insert section 440. The engagement surface 430 has a complementary angle (equivalent to angle β in FIG. 4) relative to the fastening axis X to the base engagement portion 436 of the fastening nut 418. In use, the engagement portion 436 of the fastening nut 418 engages with the engagement surface 430 of the bearing body 421 when the fastening nut 418 is assembled on a wheel stud 414 to fasten the composite wheel 410 between the bearing body 421 and the wheel mount.

In this embodiment, the engagement surface 430 is positioned at the distal end 452 of the insert section 440, again formed in and extending radially inwards from the inner wall thereof. This positions the engagement surface 430 below the bearing body 421, below the top surface 447 of the composite wheel, with a section of that engagement surface 430 extending below the composite wheel 410, located within the insert section aperture recess 456 of the backing plate 422. This enables each fastening nut 418 to be recessed through the bearing body 421 and into the respective insert section 440. This configuration positions the fastening nut 418 in an even lower position than the embodiment illustrated in FIGS. 1 to 5, providing an even smaller stack height.

The insert section 440 of the bearing body 421 is preferably not bonded to the composite wheel 10 in any way. This allows the insert section 440 to slide relative to the attachment aperture 24 in the composite wheel 410.

The attachment insert 420 is configured to project the compressive force from that clamping engagement outwards from the engagement surface 430 and axially (relative to fastening axis X) back up the insert section 440, and to the base 444 of the bearing body 421. As best shown in FIG. 10, this indirectly creates a compression force JC between the base 455 of the bearing body 421 and the backing plate 422, sandwiching the material of the composite wheel 10 together between the base 455 of the bearing body 421 and the backing plate 422 thereby securely fastening the wheel 410 onto the wheel mount 412. The transfer of forces results from the fastening nut 418 being is fastened onto the end of the wheel stud 414 (creating tension BT in the wheel stud 414). Tightening of the fastening nut 418 on the wheel stud 414 engages the engagement portion 436 of the fastening nut 418 onto the engagement surface 430 creating a compression force SC on the engagement surface 430, which is transferred into the adjoining portion of the insert section 440. This in turn creates a tension force ST between the engagement surface 430 and the bearing body 421, which in turn applies a compression force JC from the base 444 of the bearing body 421 onto the surface 447 of the composite wheel 410 around the attachment aperture 424. The transfer of forces from the engagement surface 430 through the insert section to the bearing body 421 ensures that the force F is distributed away from the edge of the attachment aperture 424 and is more evenly distributed across the composite surface 447 and then on and through the composite structure around the attachment aperture 424. For this embodiment, the shared nature of the bearing body 421 provides even greater distribution of those forces over the across the composite surface 447.

Figure 11:
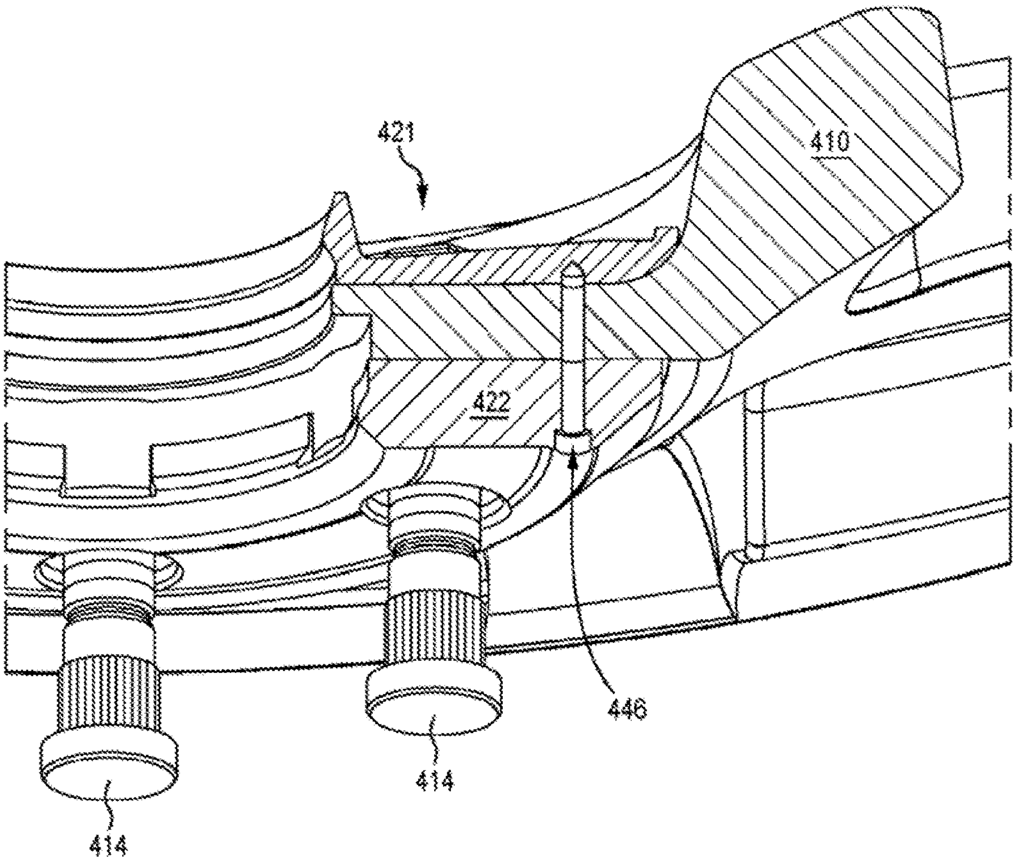
FIG. 11 provides a cross-sectional perspective view of the wheel arrangement shown in FIG. 8 illustrating retention aperture for retaining the bearing body front plate and backing plate on the composite wheel.

As best shown in FIGS. 9, 10 and 11, the backing plate 422 is designed to be inserted between the wheel mount 412 and the composite wheel 410. The illustrated backing plate 422 is a flat toroid shaped plate which includes eight annularly spaced apart insert section apertures 454—corresponding with the number of attachment apertures 424 in the composite wheel—through which the wheel stud 414 extends. The backing plate 422 provides a large surface on the opposite side of the attachment apertures 424 to the bearing body 421 against which the composite wheel 410 can be clamped by compression force JC (FIG. 10). As shown in FIGS. 10, the backing plate 422 includes a series of insert section aperture recesses 456 which are concentrically arranged with each of the insert section apertures 454. The recesses 456 seat the distal ends 452 of the insert sections 440 therein as described above. Again, the distal end 452 of the insert section 440 does not directly engage (radially or axially relative to axis X-X) any part of the wheel mount 412 or the backing plate 422.

In the illustrated embodiment, a fastener such as a shoulder bolt is fastened in recess 446 (FIG. 11) to loosely hold the shared bearing body 421 and the backing plate 422 together though the carbon fibre wheel 410. This also prevents rotation of the bearing body 421. Nevertheless, it should be appreciated that equally an alternate retention feature, for example a circlip or other fastener arrangement provided on the distal end of each insert section 440 or similar could be equally be used to perform this function. Here a further section may axially extend from the distal end 452 of the insert section 440 through the respective insert section aperture 454, onto which the fastener arrangement is attached. Similarly, embodiments of the insert section 440 may include a sleeve or similar extension section that axially extends from the distal end 452 of the insert section 440 through the respective insert section aperture 454.

When fitted to a composite wheel 10 (for example as shown in FIG. 1), the attachment arrangement 16, 216, 316, 416 is preloaded tension between the annular engagement surface 30, 230, 330, 430 of the arrangement 16, 216, 316, 416 and the base 44, 244, 344, 444 of the bearing body 21, 221, 321, 421 (and the load transfer zone 45, 345, 445 of the surface of the composite wheel 10 around the attachment aperture 24, 224, 324, 424) through tightening of the fastening nut 18 on wheel studs 14, 314, 414 (embodiment shown in FIGS. 1 to 5, FIG. 7 or FIGS. 8 to 11 respectfully), or tightening of the fastening bolt 218 (embodiment shown in FIG. 6). This also preloads compression between the base 44, 244, 344, 444 of the bearing body 21, 221, 321, 421 and the surface of the composite wheel 10 around the attachment aperture 24, 224, 324, 424.

While the illustrated embodiment relates to a carbon fibre wheel 10, it should be appreciated that the illustrated attachment arrangement could be adapted for use with any similar type of composite material, structure or component which is designed to be fastened to a mount and in which compression joint damage can occur.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. An attachment arrangement configured to attach at least one composite wheel to a wheel mount, the composite wheel including at least one attachment aperture through which an elongate fastener element is inserted, the attachment arrangement including:

(A) a fastening body which includes the elongate fastener element or is configured to be fastened onto the elongate fastener element, the fastening body having an engagement portion; and (B) an attachment insert that includes:

a bearing body which includes a base configured to face a surface of the composite wheel about the attachment aperture;

a fastening aperture through which the elongate fastener element is inserted when in use, the fastening aperture including a fastening axis;

an insert section which extends axially away from the base of the bearing body relative to the fastening axis about the fastening aperture, the insert section being configured to extend into the attachment aperture of the composite wheel; and at least one engagement surface extending from an inner surface of the insert section, the at least one engagement surface having a substantially complementary configuration to the engagement portion of the fastening body and is configured to operatively engage the engagement portion of the fastening body when the fastening body fastens to the wheel mount through the elongate fastener element, wherein at least a portion of the at least one engagement surface is located below the base of the bearing body and between the base of the bearing body and a distal end of the insert section, and wherein in use with the fastening body fastened to the wheel mount through the elongate fastener element, the distal end of the insert section extends into the attachment aperture of the composite wheel and is spaced apart from the wheel mount, or from or in an element located in, on, or integral with, the wheel mount such that the distal end of the insert section does not directly engage with or transfer force to the wheel mount does not directly engage with or transfer force to the wheel mount through said element.

2. The attachment arrangement according to claim 1, wherein the at least one engagement surface includes a distal end and said distal end of the engagement surface is located axially away from the base of the bearing body relative to the fastening axis and between the base of the bearing body and the distal end of the insert section.

3. The attachment arrangement according to claim 1, wherein the at least one engagement surface is located axially away from the base of the bearing body, and axially through and below the fastening aperture, relative to the fastening axis.

4. The attachment arrangement according to claim 1, wherein at least part of the least one engagement surface is located axially above the base of the bearing body relative to the fastening axis.

5. The attachment arrangement according to claim 1, wherein the at least one engagement surface is substantially located between the base of the bearing body and the distal end of the insert section.

6. The attachment arrangement according to claim 1, wherein the bearing body includes a body aperture sized to receive at least a portion of the fastening body, and the body aperture optionally extends into the insert section of the attachment insert.

7. The attachment arrangement according to claim 1, wherein the insert section includes a first section having a first internal diameter to receive the fastening body, and a second section having a second internal diameter sized to capture the fastening body, and through which the elongate fastener element can extend.

8. The attachment arrangement according to claim 1, wherein the base of the bearing body includes a substantially flat contact surface configured to abut the surface of the composite wheel about the attachment aperture.

9. The attachment arrangement according to claim 1, wherein the composite wheel includes at least two attachment apertures, and the bearing body extends over a surface of the composite wheel between and around each of the at least two attachment apertures.

10. The attachment arrangement according to claim 9, wherein the bearing body comprises a substantially planar body, optionally a plate, which extends between and around each attachment aperture.

11. The attachment arrangement according to claim 9, wherein the bearing body includes at least two fastening apertures and at least two insert sections corresponding to the number of attachment apertures in said composite wheel, each insert section extending into a respective attachment aperture of the composite wheel.

12. The attachment arrangement according to claim 9, wherein the bearing body has a contoured engagement face having a complementary configuration to the surface of the composite wheel on which the bearing body engages.

13. The attachment arrangement according to claim 1, wherein the fastening body comprises at least one of:

a fastening bolt which includes a fastening head including the engagement portion and the elongate fastener, the elongate fastener being configured to be connected in the wheel mount; or a fastening nut which is assembled onto the elongate fastener element so as to operatively engage the engagement portion of said fastening nut with the at least one engagement surface of the attachment insert.

14. The attachment arrangement according to claim 1, wherein the engagement surface is angled or curved relative to the fastening axis, and optionally wherein the angled engagement surface has an angle of between 10 and 80 degrees relative to the fastening axis, optionally between 30 and 60 degrees.

15. The attachment arrangement according to claim 14, wherein the engagement surface comprises a substantially annular portion of an inner wall of the insert section.

16. The attachment arrangement according to claim 1, wherein the insert section is configured to extend into and through the attachment aperture of the composite wheel, and the element located adjacent the wheel mount comprises at least one backing element configured to be inserted between the wheel mount and the composite wheel, the at least one backing element including at least one section of the fastening aperture.

17. The attachment arrangement according to claim 16, wherein:

the distal end of the insert section is configured to be received in the at least one section of the fastening aperture included in the at least one backing element, and optionally said at least one section of the fastening aperture included in the at least one backing element is sized to allow at least a portion of the insert section to move through said at least one section of the fastening aperture included in the at least one backing element, and optionally said at least one section of the fastening aperture included in the at least one backing element is sized to provide a sliding fit between a portion of the distal end of the insert section and the at least one backing element.

18. The attachment arrangement according to claim 16, comprising one or more of the following:

the distal end of the insert section is configured to be received in an insert section aperture located in the wheel mount or the at least one backing element, and the distal end of the insert section includes at least one retention feature which prevents withdrawal of the insert section through the insert section aperture; and/or the base of the bearing body includes a fixing feature which substantially prevents axial rotation of the insert section relative to the wheel mount, and wherein the fixing feature optionally comprises at least one projection, spigot, flange or embossment that is seated in at least one complementary groove, hole, aperture, detent, recess or depression in the surface of the composite wheel.

19. The attachment arrangement according to claim 1, wherein the composite wheel comprises a carbon fibre composite wheel.

20. A composite wheel including the attachment arrangement according to claim 1, optionally comprising a carbon fibre composite wheel.

* * * * *